No. 884,440. PATENTED APR. 14, 1908.
P. WERNICKE.
BRICK MOLDING APPARATUS.
APPLICATION FILED DEC. 27, 1906.

Witnesses
A. J. Haddan
H. Pausch

Inventor
Paul Wernicke
by H. Haddan
his Attorney.

UNITED STATES PATENT OFFICE.

PAUL WERNICKE, OF EILENBURG, GERMANY, ASSIGNOR TO THE FIRM OF DR. BERNHARDI SOHN G. E. DRAENERT, OF EILENBURG, GERMANY.

BRICK-MOLDING APPARATUS.

No. 884,440.   Specification of Letters Patent.   Patented April 14, 1908.

Application filed December 27, 1906. Serial No. 349,740.

*To all whom it may concern:*

Be it known that I, PAUL WERNICKE, a subject of the German Emperor, residing at Eilenburg, Germany, have invented Brick-Molding Apparatus, of which the following is a specification.

In the molds of certain brick-making machines the stock-boards or bottoms are provided with recesses for the insertion of narrow boards by means of which the bricks are removed, but loose bottoms or plates must be placed in these molds before the clay is introduced. This operation involves loss of time and thus renders the construction and method indicated unsuitable for use in connection with automatic brick-making machines driven at comparatively high speed.

The present invention provides means for removing bricks from molds, and for supporting the former after their removal, without the aid of a loose bottom placed underneath the clay. For this purpose the "follower" of the mold is provided with recesses extending downwardly from the upper face thereof to a suitable depth, and in the mold there are fixed cross bars which traverse the mold in said recesses, these bars being so placed that the upper surfaces of the bars and the upper surface of the follower form a flat and continuous plane when the follower is in its lowest position.

Figure 1:
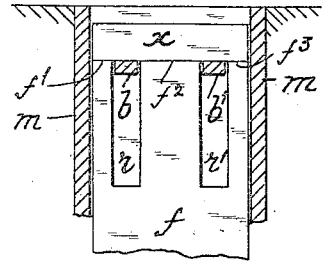
Figure 3:
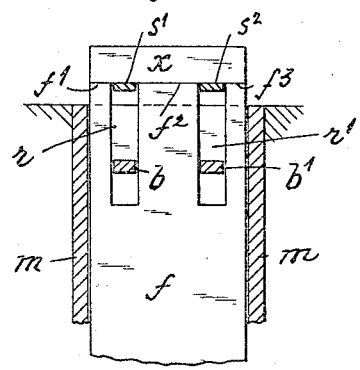
Figure 2:
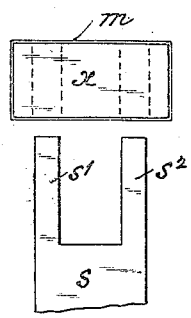
Figure 4:
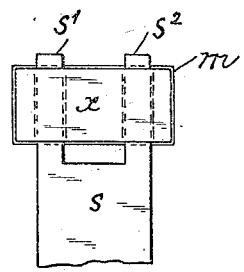

The invention is illustrated in the annexed drawing in which, Figure 1 is a vertical section of the mold, showing the follower in side elevation and a brick lying thereon, the follower being in its lowest position. Fig. 2 is a diagrammatic plan view thereof showing also the fork by means of which the brick is to be removed. Fig. 3 is a view similar to Fig. 1 and Fig. 4 is a view similar to Fig. 2 showing the follower raised and the fork inserted under the brick.

$m$ represents the mold open above and below.

$f$ is the follower which in the example illustrated is formed with two recesses $r\,r^1$ of suitable depth.

$b\,b^1$ are two bars fixed in the mold $m$ and passing across the cavity of the latter within the recesses $r\,r^1$.

Assuming the under face of the brick to be flat, the surfaces $f^1\,f^2\,f^3$ of the follower and the upper surfaces of the bars $b\,b^1$ form a flat and continuous plane when the follower is in the lowest position represented in Fig. 1. After the clay has been put into the mold and compressed by the stamper (not shown) to form a brick as represented at $x$, the follower $f$ is moved upwards as shown in Fig. 3 until the faces $f^1\,f^2\,f^3$ are above the edge of the mold $m$. Portions of the under surface of the raised brick $x$ are thus exposed, as shown in Fig. 3. A bifurcated support $s$ is then thrust forward, and the arms $s^1\,s^2$ of the said support pass under the brick between the faces $f^1\,f^2$ and $f^2\,f^3$, as shown in Fig. 2 and in the corresponding plan view, Fig. 4. The follower $f$ may now be lowered, so that the brick rests upon the supports alone. The support $s$ may be removed with the brick thereon, or the brick may be separately removed by hand.

What I claim as my invention and desire to secure by Letters Patent of the United States is:—

In a brick molding apparatus the combination with a mold of a follower, the bearing surface of which is provided with recesses, transverse bars in said recesses, said bars being fixed in the mold in such relation to the surface of the follower as to form therewith a continuous surface conforming to that of the underside of the brick when the follower is in its lowest position, and a forked support, movable above the mold and having its arms located to pass into the recesses of the follower for the purpose set forth.

In witness whereof I have signed this specification in the presence of two witnesses.

PAUL WERNICKE.

Witnesses:
  MORITZ SPREER,
  RUDOLPH FRICKE.